United States Patent Office 2,902,485
Patented Sept. 1, 1959

2,902,485

PHENTHIAZINE DERIVATIVES

Raymond Jacques Horclois, Malakoff, France, assignor to Societe des Usines Chimiques Rhone-Poulenc, Paris, France, a French body corporate No Drawing. Original application February 2, 1955, Serial No. 485,799. Divided and this application November 15, 1957, Serial No. 696,624

Claims priority, application Great Britain April 27, 1954

6 Claims. (Cl. 260—243)

This invention relates to new phenthiazine derivatives having utility as intermediates for the production of new 10-piperazinyl alkylphenthiazine derivatives of value as therapeutic agents.

This application is a division of my application Serial No. 485,799, filed February 2, 1955.

The new phenthiazine derivatives of the present invention have the basic structural formula:

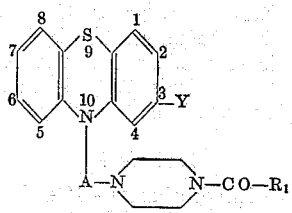

I where Y is a member selected from the group consisting of hydrogen and chlorine, A is a divalent saturated aliphatic hydrocarbon with a straight or branched chain containing 2 to 6 carbon atoms, and $R_1$ is a member selected from the group consisting of methyl, ethyl, ethoxy, benzyloxy, amino, dimethylamino, diethylamino and phenylamino. One or more of the carbon atoms of the piperazine ring may carry a substituent in the form of a methyl group.

The new 10-piperazinyl alkylphenthiazine derivatives having value as therapeutic agents produced from the intermediates of the present invention are those containing the structure:

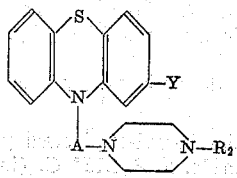

II and include not only the bases conforming to the above formula but also the corresponding acid addition and quaternary ammonium salts and addition compounds (such, for example, as those formed between the bases and 8-chlorotheophylline). In Formula II, Y and A are the same as set forth in connection with Formula I, and $R_2$ is selected from the group consisting of a hydrogen atom and a lower alkyl or araliphatic group. One or more of the carbon atoms of the piperazine ring may carry a substituent in the form of a methyl group.

As will hereinafter be more fully discussed, the group —CO—$R_1$ of Formula I is convertible by chemical means to the group $R_2$ of Formula II, such as by reduction, or by hydrolysis to form the compound where $R_2$ represents H, followed by subsequent alkylation, if desired, to provide compounds where $R_2$ is a lower alkyl or araliphatic group.

The phenthiazine intermediates of the present invention may be prepared in a variety of different ways, of which the more important can be expressed generically as comprising the interaction of a phenthiazine compound having a structure represented by the formula:

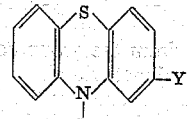

III with a compound Q (where Y is hydrogen or chlorine), the group P and the compound Q being such that Q will react with the compound of Formula III to introduce or form at the 10-position of the ring a substituent grouping of the structure:

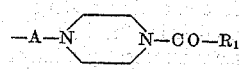

IV

In Formula IV, A and $R_1$ are as defined in Formula I.

Specific embodiments of the generic process defined in the last preceding paragraph are as follows:

(1) Interaction of a phenthiazine of the general formula:

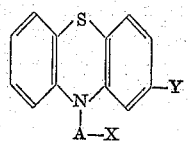

V with a piperazine derivative of the general formula:

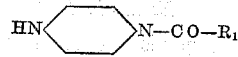

VI where X represents the residue of a reactive ester (e.g. a halogen atom or a sulphuric or sulphonic ester radical such as a p-toluene sulphonate radical) and the other variables are as hereinbefore defined;

(2) Interaction of a phenthiazine of the general formula:

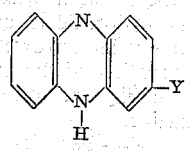

VII with a piperazine derivative of the general formula:

VIII wherein the stated variables are as hereinbefore defined.

The aforesaid processes may be carried out by heating the reactants in the presence or absence of an organic diluent and, if desired, in the presence of an alkaline condensing agent, e.g. an alkali metal or derivative thereof such as the hydroxides, hydrides, amides, or alcoholates, and more particularly sodium hydroxide or sodamide.

By way of specific illustration, intermediates of the following formula:

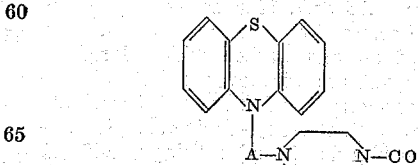

where $R_1$ is an alkyl group, can be prepared by the aforesaid processes and then converted by reduction into the products of Formula II where $R_2$ is a lower alkyl group, as illustrated in specific Examples II and III.

By way of further illustration, intermediates of the following formula:

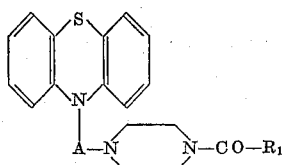

where $R_1$ is selected from the group consisting of ethoxy, benzyloxy, amino, dimethylamino, diethylamino and phenylamino can be prepared by the aforesaid processes and then converted by hydrolysis into products of Formula II where $R_2$ is hydrogen, as illustrated in specific Examples I, IV, and V. The products thus formed can then be converted by alkylation in to the desired compounds where $R_2$ of Formula II is a lower alkyl or araliphatic group, as illustrated in Example VI.

The compounds containing a structure conforming to Formula II prepared from the intermediates of the present invention possess interesting pharmacodynamic properties; in particular, they have been found to be very active antiepileptics and antiemetics. In consequence, they have application in human or veterinary medicine.

Especially outstanding utility as antiemetic agents is possessed by those of the said compounds in which Y represents a hydrogen or chlorine atom in the 3 position, A represents $-(CH_2)_3-$, $R_2$ represents a hydrogen atom or a methyl or ethyl group, and the piperazine ring is either unsubstituted or is substituted by a methyl group. Consequently, the intermediates of the present invention convertible into these compounds are preferred.

The invention is illustrated by the following examples:

Example I

Phenthiazine (10 g.) is converted to the sodium derivative by treatment with sodamide (2.25 g.) in xylene (75 cc.) and the product is condensed with a solution in xylene of 1-(2-chloroethyl)-4-benzyloxycarbonylpiperazine obtained from the corresponding hydrochloride (16 g.) forming 10-(2-4'-benzyloxycarbonyl-1-piperazinylethyl)-phenthiazine.

By treatment of the solution with water (100 cc.), extraction with 2 N hydrochloric acid (2 x 50 cc.), treatment with aqueous sodium hydroxide, extraction with chloroform and preparation of the hydrochloride, there is obtained directly the dihydrochloride of 10-(2-1'-piperazinylethyl)-phenthiazine.

1 - (2 - chloroethyl) - 4 - benzyloxycarbonylpiperazine hydrochloride, M.P. 130–132° C. (inst.), is obtained by the action of thionyl chloride upon 1-(2-hydroxyethyl)-4-benzyloxycarbonylpiperazine hydrochloride in benzene. 1-(2-hydroxyethyl)-4-benzyloxycarbonylpiperazine, B.P. 286–288° C./mm. Hg, is obtained by condensing ethylene oxide with 1-benzyloxycarbonylpiperazine in methanol.

Example II

A solution of 10-(2-4'-propionyl-1'-piperazinylethyl)-phenthiazine (1.5 g.) in tetrahydrofuran (8 cc.) is added over 15 minutes to a 2% ethereal solution of lithium aluminum hydride (10 cc.).

The mixture is heated with agitation under reflux for 6 hours and, after standing over night, is treated successively with water (0.25 cc.), 15% sodium hydroxide (0.25 cc.), water (7 cc.) and chloroform (20 cc.). The precipitate is filtered off and washed with chloroform (5 x 5 cc.). The liquors are dried over sodium sulphate and concentrated, and on the addition of ethereal hydrogen chloride give 10-(2-4'-propyl-1'-piperazinylethyl)-phenthiazine dihydrochloride (1.5 g.) melting at 240° C. (inst.).

10 - (2 - 4'-propionyl - 1' - piperazinylethyl) - phenthiazine hydrochloride, M.P. 165° C. (inst.), is obtained by the action of propionyl chloride on 10-(2-1'-piperazinylethyl)-phenthiazine in the presence of pyridine.

Example III

A solution of 3-chloro-10-(3-4'-acetyl-1'-piperazinylpropyl)-phenthiazine (0.6 g.) in tetrahydrofuran (8 cc.) is added over ½ hour to a 2% ethereal solution of lithium aluminum hydride (10 cc.) and the mixture is heated for 7 hours under reflux with agitation. The usual treatment yields 3-chloro-10-(3-4'-ethyl-1'-piperazinylpropyl)-phenthiazine dihydrochloride, M.P. 220–225° C. (inst.).

3 - chloro - 10 - (3 - 4' - acetyl - 1' - piperazinylpropyl)-phenthiazine hydrochloride, M.P. 215° C. (inst.), is obtained by the action of acetyl chloride and pyridine upon 3-chloro-10-(3-1'-piperazinylpropyl)-phenthiazine.

Example IV

10 - (2 - 4' - ethoxycarbonyl - 1' - piperazinylethyl)-phenthiazine (1 g.) is heated for 24 hours under reflux with alcoholic potassium hydroxide (250 g. per litre; 15 cc.). The solution is concentrated and treated with water (5 cc.) and ether (4 x 10 cc.). The addition of ethereal hydrogen chloride yields 10-(2-1'-piperazinylethyl)-phenthiazine dihydrochloride (0.7 g.) which, after recrystallization from ethanol, melts at 260° C. (inst.).

10 - (2 - 4' - ethoxycarbonyl - 1' - piperazinylethyl)-phenthiazine may be obtained by heating 10-(2-chloroethyl)-phenthiazine (10.5 g.) with 1-ethoxycarbonylpiperazine (31.6 g.) for 4 hours at 195° C. and then treating the mixture with water (30 cc.) and ether (2 x 20 cc.). The ethereal solution is shaken with 10% hydrochloric acid (35 cc.), and treatment with sodium hydroxide and ether yields 10-(2-4'-ethoxycarbonyl-1'-piperazinylethyl)-phenthiazine (16.5 g.), M.P. 95° C. (inst.).

Example V

10 - (2 - 4' - diethylcarbamyl - 1' - piperazinylethyl)-phenthiazine hydrochloride (0.3 g.) is heated for 30 hours under reflux with hydrochloric acid ($d=1.19$, 7 cc.). Water (20 cc.) is then added, a small quantity of insoluble matter is filtered off and the aqueous solution is treated with sodium hydroxide solution ($d=1.33$, 8 cc.). Extraction with chloroform (2 x 20 cc.), drying over sodium sulphate, concentration and treatment with ethereal hydrogen chloride yields 10-(2-1'-piperazinylethyl)-phenthiazine dihydrochloride (0.15 g.) which, after recrystallization from ethanol, melts at 260° C. (inst.).

10 - (2 - 4' - diethylcarbamyl - 1' - piperazinylethyl)-phenthiazine may be obtained by heating 10-(2-chloroethyl)-phenthiazine (5.2 g.) with 1-diethylcarbamylpiperazine (18.5 g.) for 5 hours at 200° C. The usual treatment yields 10-(2-4'-diethylcarbamyl-1'-piperazinylethyl)-phenthiazine hydrochloride (6 g.) M.P. 182–184° C. (inst.).

The following derivatives may also be treated in a similar manner:

10-(2-4'-dimethylcarbamyl-1'-piperazinylethyl)-phenthiazine hydrochloride, M.P. 215° C. (inst.).

10 - (2 - 4' - phenylcarbamyl - 1' - piperazinylethyl)-phenthiazine, M.P. 160° C. (inst.).

10 - (2 - 4' - carbamyl - 1' - piperazinylethyl) - phenthiazine hydrochloride, M.P. 180° C. (inst.).

Example VI

10 - (2 - 1' - piperazinylethyl) - phenthiazine (6.2 g.), n-butyl p-toluenesulphonate (6.9 g.), anhydrous sodium carbonate (1.6 g.) and ethanol (10 cc.) are heated for five hours under reflux. The mixture is treated with N sodium hydroxide (30 cc.) and ether (2 x 50 cc.), and the ethereal solution is extracted with N hydrochloric acid (2 x 20 cc.). The acid layer is then treated with aqueous sodium hydroxide ($d=1.33$, 10 cc.) and is extracted with ether (2 x 50 cc.). After concentration, the base is treated with alcohol and ethereal hydrogen chloride to give 10-(2-4'-butyl-1'-piperazinylethyl)-phenthiazine dihydrochloride (4.5 g.), which melts at 226° C. (inst.).

It should be noted that in the foregoing specification and in the appended claims the system of numbering of substituents in the phenthiazine ring is that of Beilstein.

I claim:

1. A phenthiazine derivative having the basic structural formula:

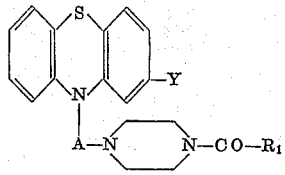

wherein Y is a member chosen from the group consisting of hydrogen and chlorine; A is a divalent saturated aliphatic hydrocarbon radical containing 2 to 6 carbon atoms at least two carbon atoms thereof separating the phenthiazine nitrogen and the piperazine N' nitrogen; and $R_1$ is a member chosen from the group consisting of methyl, ethyl, ethoxy, benzyloxy, amino, dimethylamino, diethylamino and phenylamino.

2. A phenthiazine derivative having the basic structural formula:

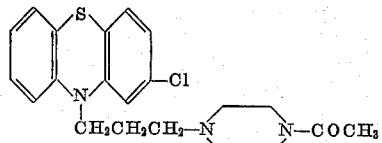

3. A phenthiazine derivative having the basic structural formula:

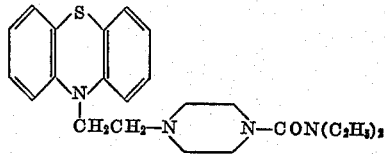

4. A phenthiazine derivative having the basic structural formula:

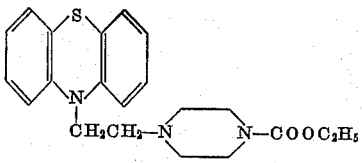

5. A phenthiazine derivative having the basic structural formula:

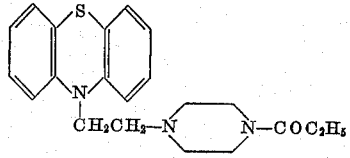

6. A phenthiazine derivative having the basic structural formula:

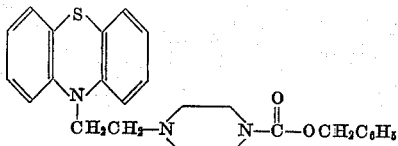

References Cited in the file of this patent

FOREIGN PATENTS

| | | |
|---|---|---|
| 1,060,189 | France | Nov. 18, 1953 |
| 293-55 | Union of South Africa | Aug. 22, 1955 |